United States Patent [19]
Kaneko et al.

[11] Patent Number: 5,250,158
[45] Date of Patent: Oct. 5, 1993

[54] METHOD FOR PRODUCING VANADIUM ELECTROLYTIC SOLUTION

[75] Inventors: Hiroko Kaneko; Akira Negishi; Ken Nozaki, all of Tsukuba; Kenji Sato; Ichiro Nakahara, both of Kashima, all of Japan

[73] Assignees: Director-General, Agency of Industrial Science and Technology, Tokyo; Kashima-Kita Electric Power Corporation, Ibaraki, both of Japan

[21] Appl. No.: 772,794

[22] Filed: Oct. 8, 1991

[30] Foreign Application Priority Data

Oct. 15, 1990 [JP] Japan .................................. 2-273356

[51] Int. Cl.⁵ .............................................. C25B 1/00
[52] U.S. Cl. ........................................ 204/86; 204/96; 252/182.1; 423/409; 423/593; 429/188
[58] Field of Search .................. 205/59 R, 86, 96; 252/182.1; 423/409, 593; 429/188

[56] References Cited

U.S. PATENT DOCUMENTS 4,243,494  1/1981  Riggs, Jr. et al. .................. 204/1.5
4,786,567  11/1988  Skyllas-Kazacos et al. ......... 429/19

Primary Examiner—John Niebling
Assistant Examiner—Patrick J. Igoe
Attorney, Agent, or Firm—Oblon, Spivak, McClelland, Maier & Neustadt

[57] ABSTRACT

A vanadium electrolytic solution containing highly concentrated and dissolved vanadium is produced by a method wherein a vanadium compound selected from the group consisting of ammonium metavanadate and vanadium pentaoxide is subjected to a reduction operation in the presence of inorganic acids. At this time, by repeating the addition of the concentrated inorganic acids and the vanadium compound, a tetravalent and pentavalent vanadium solution of 3.4 mol/l is obtained.

In addition, the resulting vanadium electrolytic solution is electrolyzed, whereby tetravalent vanadium is reduced to be trivalent on the negative electrode and is oxidized into pentavalent vanadium on the positive electrode, and then pentavalent vanadium is reduced into tetravalent vanadium by a reducing agent to form a discharged couple of trivalent and tetravalent vanadium, and an electrolytic solution is obtained which is capable of being charge-discharged.

This electrolytic solution can be used as the electrolytic solution for redox batteries using vanadium as the active material in both positive and negative electrodes.

10 Claims, 2 Drawing Sheets

METHOD FOR PRODUCING VANADIUM ELECTROLYTIC SOLUTION

BACKGROUND OF THE INVENTION

1. Field of the Invention

This invention concerns a method for producing an electrolytic solution for redox batteries, and, in particular, for a highly concentrated vanadium electrolytic solution.

2. Description of the Related Art

In recent years, through global problems such as acid rain, the destruction of the ozone layer by fluorocarbons, and the greenhouse effect due to an increase in carbon dioxide in the atmosphere, environmental problems are being focussed upon as a problem for all mankind. In the midst of this state of affairs, the movement to make the fullest possible use of solar energy, an inexhaustible and clean form of energy that is friendly towards the earth, has increased considerably. Examples of this include solar batteries, power generation making use of solar heat or heat reclamation, wind-turbine generation, and wave power generation (power generation making use of the energy of ocean currents, or temperature differences of seawater).

Of all of these, it is solar batteries, with a remarkable revolution in technology, that show signs of heading towards the time when they are ready for genuine practical applications, through improvements in their efficiency and a significant lowering in price. Currently, use of solar batteries is restricted to rather small-scale applications such as in powering road signs and communications relays, but rapid developments are also expected through envisioned solar energy cities and the implementation of designs to lay fields of batteries in the oceans or deserts. However, the power output of all of these power generation methods making use of solar energy is affected by climactic conditions, thus making stable and trustworthy production of electrical power impossible. Coordinated use of solar energy and reliable, effective batteries are required, and the realization there of has been long awaited.

Moreover, electrical power may be easily converted into other types of energy, is easy to control, and causes no environmental pollution at the time of its consumption, and it is for these reasons that the percentage of total consumption taken up by electrical power is increasing every year. The distinguishing characteristic of electrical power is that its production and consumption are simultaneous with each other, and that it cannot be stored. It is for this reason that, at present, highly efficient nuclear power generation and advanced thermal power generation are being operated at the highest possible efficiency ratings, and that the large increase in demand for electricity during daylight hours is being met by with small-scale thermal and hydropower generation suitable for generating power in response to fluctuations in consumption of electrical power; thus the current state of affairs is such that excess energy is being produced at night. The power generation world is earnestly hoping for development of technology that will make it possible to store this excess energy at night and use it efficiently during the day.

From circumstances such as those above, all types of secondary batteries have been studied as a method of storing electrical energy which does not pollute the environment and as an energy with a wide variety of applications. Redox batteries have received special attention as a high-volume stationary battery capable of operating at room temperatures and atmospheric pressure.

Redox batteries pass an electrically active materials of postive and negative solution to the cells with flow-through electrodes, and making use of a redox reaction, perform charging and discharging of batteries, and thus have a comparatively longer life than normal secondary batteries, with minimized self-discharging, and possess the advantages of being high in both reliability and safety. In recent years the actualization of redox batteries have received considerable attention.

At present, redox batteries which are held to be in the stage of practical use, that is those with redox couple of bivalent and trivalent chromium vs. bivalent and trivalent iron, cannot be made to have cencentrated solutions due to cross-mixing with iron and chromium passing through the membrane of the cells and limitations on solubility. Also, with an output voltage for a single cell of approximately 0.9-1 volts (V), their energy density is low. Furthermore, when the charged state of the electrodes becomes unequal due to generation of hydrogen on the negative electrode, there is the danger of generating chlorine from the positive electrode during charging.

In order to overcome the above faults, the use of a chromium and chlorine redox couple has been proposed (Japanese Patent Laid-open No.61-24172), but in this battery as well the redox electric potential of chromous and chromic ions is close to the electric potential for hydrogen generatin, the problem of a lowering of efficiency due to the generation of hydrogen gas has been solved, and, since it uses chlorine as an active material, there is a problem with storing large quantities of chlorine.

Moreover, as an active material capable of improving the electrode reaction of both postive and negative electrodes, there have also been proposals to make use of iron, copper, tin, nickel, and halogen acidic solutions (Japanese Patent Laid-open No.60-207258), but with any combination of these, problems exist such as the electromotive force for a single battery being low, and the complex electrode reaction of the interaction of metals and the electrodes, so that these solutions were not necessarily satisfactory.

On the other hand, there has also been a proposal for a redox battery with positive and negative electrodes which have trivalent and bivalent ion pairs, and tetravalent and pentavalent vanadium dissolved in a sulfuric solution (U.S. Pat. No. 4,786,567, Journal of Power Sources 15 (1985) 179-190 and 16 (1985) 85-95). This battery has a high output voltage of 1.4 V to 1.5 V, and is characterized by its high efficiency and high energy density, but in order to obtain a high-density vanadium solution, costly vanadyl sulfate must be used, and this has been viewed as being poorly suited for practical use. As a material for the production of the vanadium solution, pentoxide vanadium or ammonium metavanadate are advantageous in price, but the solubility of the former with respect to sulfuric acid solutions is extremely poor and there are also problems with the solubility of the latter, making it difficult to prepare a solution having the concentration necessary for an electrolytic solution, and costly vanadyl sulfate should be used.

Redox batteries are composed of a membrane made up from a ion exchange membrane, carbon cloth electrodes (positive electrode and negative electrode) on either side of this membrane, and an end plate on the outer side of the membrane. The positive electrolyte and negative electrolyte are sent to the positive and negative electrodes from the positive electrolyte tank and the negative electrolyte tank respectively.

In initial charging, on the positive electrode tetravalent vanadium is oxidized into pentavalent vanadium, and in the negative electrode, tetravalent vanadium is reduced to trivalent vanadium. If charging is continued even further, in the negative electrode, trivalent vanadium is further reduced to bivalent vanadium, but on the positive electrode this causes either overcharging or oxygen generation. Therefore, in order to avoid this, it has been necessary the exchange to electrolyte with a tetravalent vanadium solution when the electrolyte on the positive electrode reaches a fully charged state. In this state, when the battery has been fully charged, on the positive electrode, an oxidation reaction from tetravalent to pentavalent vanadium takes place, and on the negative electrode, a reduction reaction from trivalent to bivalent vanadium takes place. In a fully discharged state, the reverse reaction occurs.

Accordingly, charge and discharge reactions are as follows:

Positive electrode reaction:

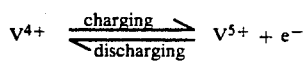

Negative electrode reaction:

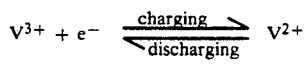

SUMMARY OF THE INVENTION

This invention is to intended to provide a method of production for an electrolyte for use in vanadium redox batteries with greater efficiency and a higher energy density using inexpensive ammonium metavanadate or vanadium pentaoxide by producing a solution of a tetravalent vanadium or a tetravalent and pentavalent vanadium mixture which is easily dissolved with reducing agent or by electrolytic reduction, by raising acid concentration even more.

This invention relates to a method for producing a vanadium electrolytic solution which comprises subjecting a vanadium compound selected from the group consisting of ammonium metavanadate and vanadium pentaoxide to a reduction operation in the presence of inorganic acids to dissolve it.

Moreover, this invention also includes a method for producing an electrolytic solution containing tetra- and trivalent vanadiums capable of being charged and discharged which comprises subjecting a vanadium compound selected from the group consisting of ammonium metavanadate and vanadium pentaoxide to a reduction operation in the presence of inorganic acids to dissolve it, electrolyzing the resulting electrolytic solution to prepare trivalent vanadium on the negative electrode and pentavalent vanadium on the positive electrode, and then converting pentavalent vanadium into tetravalent vanadium by a reducing agent.

DESCRIPTION OF PREFERRED EMBODIMENTS

Vanadium compounds used as starting materials in this invention are ammonium metavanadate and vanadium pentaoxide.

Any ammonium metavanadate at all may be used, but the use of ammonium metavanadate recovered from the ash which is generated when high-sulfur heavy oil fuels are burned in a boiler (e.g., Japanese Patent Laid-open No.60-19068) is inexpensive and economical.

Recovered ammonium metavanadate has a composition of $NH_4VO_3$ 99.1%; Ni below 0.01%; Fe below 0.01%; Mg below 0.05%; Ca below 0.01%; Na below 0.01%; Al below 0.05%; Si below 0.2%.

When this ammonium metavanadate is placed into a diluted sulfuric acid solution, it dissolves gradually and the solution takes on the yellow color of $VO^{2+}$, but at room temperature no more than 0.27 mole/l (M) dissolves in a 2M of diluted sulfuric acid solution. On the other hand, vanadium pentaoxide also has a low solubility to sulfuric acid, and the solubility thereof in a 2M sulfuric acid solution is at most 0.1M.

Thus, according to the present invention, the vanadium solution of above 1M necessary for an electrolyte can be prepared by subjecting a vanadium compound in the presence of an inorganic compound to a reduction operation. To raise the concentration of vanadium even further, concentrated inorganic acids such as concentrated sulfuric acid, concentrated hydrochloric acid, and concentrated nitric acid are added, and then the vanadium compound is additionally added and dissolved.

Desirable embodiments for the preparation of a highly concentrated solution require that a vanadium saturated solution or a supersaturated solution is prepared, a concentrated inorganic acid is added to this solution, and then the vanadium compound is additionally added and dissolved. This operation is then repeated (the addition of inorganic acid and the addition of a vanadium compound) 2 or more times, most desirably 8-12 times.

Through a procedure such as this, it is possible to prepare a highly concentrated vanadium solution comprised of a maximum of 3.4M of tetravalent and pentavalent vanadium.

Tetravalent and pentavalent vanadium ions mix together in the highly concentrated vanadium solution thus gained.

Also, in the process of the repeated procedure above, a reduction operation may be appropriately inserted as required.

The reduction operation of this invention takes place through the action of a reducing agent or through electrolytic reduction.

As reducing agents, there can be given sulfurous acid, hydrazine dihydrochloride, hydrogen gas, and hydrogen peroxide. Two or more of these reductants may also be used together. Most desirable of these reductans is sulfurous acid. In particular, speaking from an economic viewpoint, sulfurous acid may be obtained easily by bringing purified sulfur dioxide gained from a Wellman-Lode Flue gas desulfurization process in power plants into contact with water, and is thus particularly attractive.

Furthermore, since sulfurous acid is oxidized into sulfuric acid during reduction of vanadium compounds, and functions as an inorganic acid to be used during or after the reduction operation, there are the advantages of being able to reduce the amount of inorganic acids. And sulfur dioxide is then introduced into the electrolytic solution which includes highly concentrated tetravalent and pentavalent vanadium to prepare a highly concentrated tetravalent vanadium electrolytic solution.

This reduction reaction for vanadium compounds with these reducing agents is carried out in the presence of inorganic acids. As inorganic acids, sulfuric acid, hydrochloric acid, phosphoric acid, and perchloric acid and the like may be used.

Note that in this reduction reaction, there is no effect whatsoever from the coexistence of sulfates such as sodium sulfate, ammonium sulfate.

The other reduction operation according to the present invention is electrolytic reduction. This electrolytic reduction is in particular most effective in making use of excess power during night hours.

This reduction may be usually carried out with a constant current by use of the reduction reaction which occurs on the negative electrode, wherein pentavalent vanadium is reduced to trivalent or bivalent vanadium. The end point of this reduction may be determined visually, as the color changes for pentavalent vanadium (yellow), tetravalent vanadium (blue), trivalent vanadium (green), and bivalent vanadium (bluish purple). On the negative electrode, vanadium is reduced from pentavalent to tetravalent vanadium, and on the positive electrode, electrolysis of the water occurs and oxygen is generated. By continuing the electrolysis, the reduction reaction progresses on the negative electrode, and the vanadium is reduced from tetravalent to trivalent, and further to bivalent vanadium.

When ammonium metavanadate is gradually added to a vanadium solution brought to a reduced state in this way, the solution is reduced and dissolved. The end point may be determined from the fact that the color of the solution turns to blue.

Through a reduction operation described above, an electrolytic solution may be effectively obtained which contains tetravalent vanadium in high concentration.

From an electrolytic solution obtained in this way an electrolytic solution can be produced capable of being charged and discharged in the following manner. That is, substantially all the tetravalent vanadium in the solution is oxidized to pentavalent vanadium on the positive electrode by electrolysis, and this is prepared into a tetravalent vanadium using a reducing agent such as sulfur dioxide, and tetravalent vanadium is reduced into trivalent vanadium on the negative electrode, and as a result a discharged couple (pair) of tetravalent and trivalent vanadium is obtained.

The electrolytic solution thus prepared is a discharged couple, and to change this into a charged couple, tetravalent vanadium is sent into the positive electrode of cell, and trivalent vanadium into the negative electrode, and then electrolyzed at a constant current. On the positive electrode tetravalent vanadium is oxidized into pentavalent vanadium, and on the negative electrode it is reduced into bivalent vanadium and a charged couple is produced.

According to this invention, as shown in the examples, as the concentration of sulfuric acid increases the solubility of the vanadium increases, and an electrolytic solution having a sulfuric acid concentration of 5-8M and a vanadium concentration of 3.4M is obtained.

In addition, pentavalent vanadium compounds are generally difficult to dissolve in sulfuric acid. However, even if tetravalent vanadium ions, which have been reduced and then dissolved, are oxidized in sulfuric acid to pentavalent ions, they are difficult to sediment and therefore, an effective electrolytic solution is presented.

Moreover, in the event that the sedimentation and separation of vanadium occur during the reaction, the vanadium which had temporarily sedimented may be dissolved by control of the temperature of the electrolytic solution and used.

EXAMPLES

Figure 1:
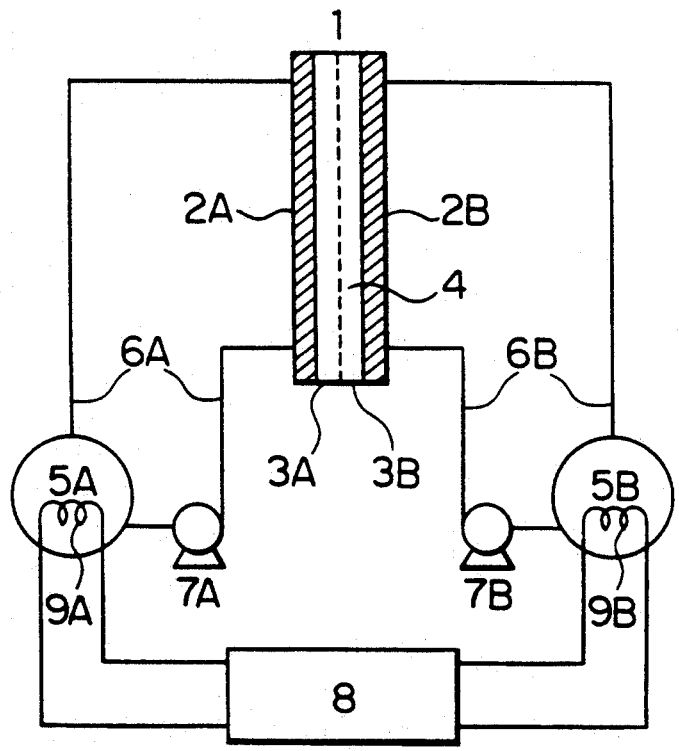
FIG. 1 is a schematic illustration indicating one example of a redox secondary battery where a battery reaction has been conducted using the electrolytic solution of this invention. 1 is a main part of the single-unit cell; 2A and 2B are positive and negative electrode endplates; 3A and 3B are negative and positive electrodes of carbon cloth; 4 is a membrane for preventing the mixing of the electrolyte; 5A and 5B are positive and negative electrode tanks for storage of the electrolyte; 6A and 6B are positive/negative electrode lines; 7A and 7B are pumps which circulate the electrolyte; 8 is an electrolyte heat pump to prevent separation of active materials in the electrolytic solution; 9A and 9B are tubes for heat exchange.

The present invention will be specifically illustrated with reference to the following examples.

EXAMPLE 1

Ammonium metavanadate was added to four solutions of 20 ml of 6% sulfurous acid, shaken within a constant temperature bath kept at 25° C., and when they became nearly saturated solutions, concentrated sulfuric acid was added so that concentration of sulfuric acid became respectively 2M, 3M, 4M and 5M. Ammonium metavanadate was further added until the saturation point was reached. Further, the same procedure was conducted for vanadium pentaoxide. The amount of vanadium compounds dissolved in the electrolytic solutions obtained is shown in Table 1.

TABLE 1

|  | sulfuric acid concentration ol/l | | | |
| --- | --- | --- | --- | --- |
|  | 2 | 3 | 4 | 5 |
| amount of dissolved NH$_4$VO$_3$ g/l | 155 | 157 | 164 | 185 |
| amount of dissolved V mol/l | 1.32 | 1.34 | 1.41 | 1.58 |
| amount of dissolved V$_2$O$_5$ g/l | — | 120 | 122 | 129 |
| amount of dissolved V mol/l | — | 1.32 | 1.34 | 1.42 |

EXAMPLE 2

Four electrolytic solutions were prepared using the same operation as in EXAMPLE 1, except that a solution having 0.1M hydrazine dihydrochloride added to 2M sulfuric acid solution and a solution where 0.44 moles of hydrogen peroxide was similarly added, were prepared and then ammonium metavanadate was added to each of these solutions. The amount of ammonium metavanadate dissolved in the electrolytic solution is shown in Table 2.

TABLE 2

| | sulfuric acid concentration mol/l | | | |
|---|---|---|---|---|
| | 2 | 3 | 4 | 5 |
| 1. amount of solution g/l | 73 | 121 | 177 | 180 |
| amount of solution mol/l | 0.62 | 1.03 | 1.51 | 1.54 |
| 2. amount of solution g/l | — | 65 | 70 | 120 |
| amount of solution mol/l | — | 0.55 | 0.60 | 1.03 |

1: addition of hydrazine dihydrochloride
2: addition of hydrogen peroxide

EXAMPLE 3

Ammonium metavanadate was added to 20 ml of 6% sulfurous acid solution, then shaken in a constant temperature bath kept at 25° C., and when it became nearly saturated solution, 1 ml of concentrated sulfuric acid was added to completely dissolve, and ammonium metavanadate was further added until a supersaturated state was reached, and this was repeated until the fixed concentration of sulfuric acid was reached.

Undissolved ammonium metavanadate was removed from the resulting electrolytic solution, and the concentration of sulfuric acid in the solution was determined by a neutralization titration using caustic soda, and the vanadium concentration was measured by the redox titration with ammonium ferous sulfate (II). The same experiment was conducted for vanadium pentaoxide. The amounts of vanadium compounds dissolved in the resulting electrolytic solution are shown in Tables 3 and 4. Accordingly, as the concentration of sulfuric acid increases, the concentration of vanadium in the electrolytic solution increases, and in the case of dissolution of ammonium metavanadate, the concentration of vanadium reached approximately 3.4M at a concentration of sulfuric acid of 5.4M.

TABLE 3

| Amount of ammonium metavanadate dissolved in the sulfric acid solution | | | | |
|---|---|---|---|---|
| Concentration of sulfuric acid mol/l | 1.18 | 3.38 | 5.37 | 6.03 |
| No. of times concentrated sulfuric acid added | 1 | 5 | 10 | 12 |
| Amount of ammonium metavanadate dissolved g/l | 169 | 256 | 395 | 366 |
| Amount of vanadium dissolved mol/l | 1.45 | 2.19 | 3.38 | 3.13 |

TABLE 4

| Amount vanadium pentaoxide dissolved in the sulfric acid solution | | | | |
|---|---|---|---|---|
| Concentration of sulfuric acid mol/l | 1.83 | 3.10 | 4.52 | 5.64 |
| NO. of times concentrated sulfuric acid added | 1 | 3 | 5 | 7 |
| Amount of $V_2O_5$ g/l | 135 | 163 | 167 | 159 |
| Amount of vanadium dissolved mol/l | 1.48 | 1.79 | 1.84 | 1.75 |

EXAMPLE 4

100 ml of 6M sulfuric acid solution was divided into two portions of 50 ml each, and a supernatant solution of ammonium metavanadate added and dissolved into each of these was passed through the positive and negative electrodes of a small scale redox cell at a flow rate of 5 ml/min., electrolysis was performed at a constant current of 0.4 A, and a solution containing tetravalent vanadium was obtained. At this time oxygen was generated on the positive electrode. As cell electrodes a carbon cloth (BW-309 made by Toyobo Co.) was utilized, and the apparent surface area was 10 cm². During electrolysis, the solution in the electrode was recirculated, but the solution in the negative electrode was reduced, and the color changed from the yellow of pentavalent vanadium to the blue of tetravalent vanadium, and ammonium metavanadate was completely dissolved. The solution in the negative electrode comprising tetravalent vanadium was further divided into two portions, and a constant current electrolysis was conducted for both electrode solutions, and the negative electrode solution comprising trivalent vanadium was obtained. The end point of the electrolysis can be clearly seen on the positive electrode as a change from the blue of tetravalent vanadium to the yellow of pentavalent vanadium and may be determined by eye, as well as by a rapid rise in the cell resistance of the battery. As a result, trivalent and pentavalent solutions were obtained in equal amounts of 25 ml.

Ammonium metavanadate was gradually added to the negative electrode solution comprising trivalent vanadium thus prepared, and an electrolytic solution having the 2M concentration of tetravalent vanadium was produced.

In addition, the negative electrode solution which was reduced to a bivalent vanadium solution by a constant current electrolysis was prepared, and ammonium metavanadate was added to the solution and reduced to obtain a tetravalent electrolytic solution.

EXAMPLE 5

100 ml of a 2M sulfuric acid solution was divided into two portions of 50 ml each, and a supernatant solution of ammonium metavanadate added and dissolved into each of these was passed through the positive and negative electrodes of a small scall redox cell at a flow rate of 5 ml/min, electrolysis was performed at a constant current of 0.4 A, and a solution containing tetravalent vanadium was obtained. At this time oxygen was generated on the positive clectrode. As cell electrodes a carbon cloth (BW-309 made by Toyobo Co.) was utilized, and the apparent surface area was 10 cm². During electrolysis, the solution in the electrode was recirculated, but the solution in the negative electrode was reduced, and the color changed from the yellow of pentavalent vanadium to the blue of tetravalent vanadium, and ammonium metavanadate was completely dissolved. The solution in the negative electrode comprising tetravalent vanadium was further divided into two portions, and a constant current electrolysis was conducted for both electrode solutions, and the negative electrode solution comprising trivalent vanadium was obtained. The end point of the electrolysis can be clearly seen on the positive electrode as a change from the blue of tetravalent vanadium to the yellow of pentavalent vanadium and may be determined by eye, as well as by a rapid rise in the cell resistance of the battery. As a result, trivalent and pentavalent solutions were obtained in equal amounts of 25 ml.

Ammonium metavanadate was gradually added to the negative electrode solution comprising trivalent vanadium thus prepared, and an electrolytic solution having the 1M concentration of tetravalent vanadium was produced.

When the negative electrode solution was reduced to a bivalent solution by constant current electrolysis, it was possible to reduce ammonium metavanadate in the same way to a tetravalent electrolytic solution.

EXAMPLE 6

The vanadium electrolytic solution prepared in EXAMPLE 1 (ammonium metavanadate solution in 2M sulfuric acid) was charged into a cell and electrolysis was performed. Tetravalent vanadium was reduced into trivalent vanadium on the negative electrode and oxidized into pentavalent vanadium on the positive electrode. The pentavalent vanadium was then reduced into tetravalent vanadium using sulfur dioxide to prepare an electrolyte capable of being charged and discharged.

In order to investigate the electrical properties of the electrolyte obtained, 10 ml of 1M vanadium solution in 2M sulfuric acid was prepared, and this was used as electrolyte for both electrodes, the charge and discharge being performed for the cell shown in FIG. 1 using a carbon cloth of an apparent surface area of 10 cm$^2$ (BW-309 made by Toyobo Co.). The flow rate of electrolyte was 3.8 ml/min., the current of charge-discharge was $\pm/-0.4$ A, and the temperature is 40° C.

Figure 2:
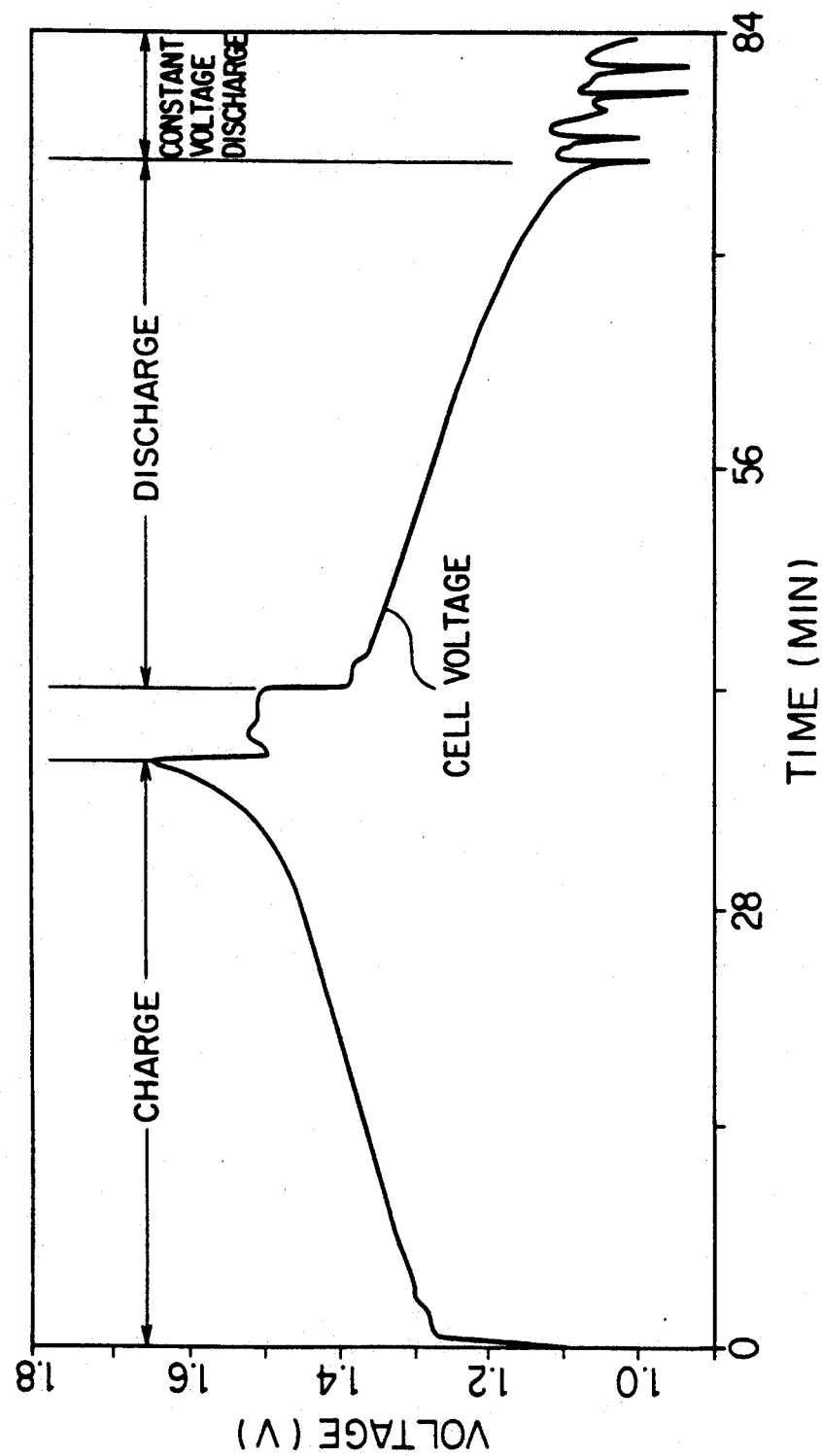
FIG. 2 shows the charge/discharge curve for a small scale cell using the electrolytic solution of this invention.

The result of this charge/discharge reaction was shown in FIG. 2. As is clear from FIG. 2, excellent charge/discharge characteristics having a Coulomb efficiency of 97.7%, voltage efficiency of 89.4% and total energy efficiency of 87.3% were obtained, and these characteristics were not inferior to those of traditional electrolyte.

EXAMPLE 7

In the vanadium electrolytic solution prepared in EXAMPLE 3 (ammonium metavanadate solution in 2.5M sulfuric acid) tetravalent and pentavalent vanadium ions coexisted. Then, this solution was divided into two portions and put into an electrolytic cell, electrolysis was performed, and all tetravalent vanadium on the positive electrode was oxidized into pentavalent vanadium and tetravalent vanadium on the negative electrode was reduced into trivalent vanadium. Next the pentavalent vanadium on the positive electrode was reduced using sulfur dioxide to prepare an electrolytic solution of tetravalent vanadium in a state capable of charging and discharging.

In order to investigate the electrical properties of the electrolytic solution obtained, 20 ml solution of 1.5M vanadium dissolved in 1.8, 3.2, 4.3, 5.0 and 6.0M sulfuric acid were prepared, and these were examined for the characteristics of battery reaction as positive/negative electrolytes. Charging and discharging were performed on the cell with a carbon cloth (BW-309) of apparent surface area of 10 cm$^2$ in the configuration shown in FIG. 1. The flow rate of electrolytic solution was 3.8 ml/min., the current was $\pm 0.4$ A, and the temperature was 25° C.. The results of this charging and discharging reaction are shown in Table 5, but as the concentration of sulfuric acid in the electrolytic solution increased, the cell resistance of the battery decreased, and efficiency of voltage and total energy efficiency became higher.

TABLE 5

| Sulfuric acid concentration | Charge/Discharge Characteristics | | | |
| --- | --- | --- | --- | --- |
| | Cell resistance Ω | Current efficiency % | Total energy efficiency % | Voltage efficiency % |
| 1.8 (mol/l) | 3.39 | 86.7 | 63.1 | 71.9 |
| 3.2 | 2.67 | 89.5 | 72.0 | 80.4 |
| 4.3 | 2.28 | 95.6 | 79.4 | 83.1 |
| 5.0 | 2.39 | 96.6 | 79.5 | 82.3 |
| 6.0 | 2.61 | 95.3 | 80.4 | 84.4 |

What is claimed is:

1. In a method for producing an electrolytic solution for redox batteries using vanadium as an active material in both positive and negative electrodes, the improvement which comprises reducing a vanadium compound selected from the group consisting of ammonium metavanadate and vanadium pentaoxide with a reducing agent in the presence of an inorganic acid to form a solution of the vanadium compound containing tetravalent vanadium ions, and then carrying out at least one further addition of said inorganic acid and said vanadium compound to the resulting solution and further reducing the added vanadium compound to form a solution containing an increased concentration of vanadium tetravalent ions.

2. The method according to claim 1 wherein said inorganic acid is a concentrated sulfuric acid.

3. The method according to claim 1 wherein the reducing agent is selected from the group consisting of sulfurous acid, hydrazine dihydrochloride, hydrogen peroxide and hydrogen.

4. In a method for the production of an electrolytic solution for redox batteries using vanadiums an active material in both positive and negative electrodes, the improvement which comprises electrolytically reducing a vanadium compound selected from the group consisting of ammonium metavanadate or vanadium pentaoxide to form a solution containing trivalent or bivalent vanadium ions, further adding said vanadium compound to said solution, and then reducing the added vanadium compound with the trivalent or bivalent vanadium ions in said solution to form a solution of the vanadium compound having tetravalent vanadium ions.

5. A method for producing an electrolytic solution capable of being charged and discharged consisting of a solution containing tetravalent ions on the positive electrode and a solution containing trivalent vanadium ions on the negative electrode which comprises reducing a vanadium compound selected from the group consisting of ammonium metavanadate and vanadium pentaoxide with a reducing agent in the presence of an inorganic acid to form a solution of the vanadium compound containing tetravalent vanadium ions, electrolyzing the resulting solution to prepare a solution containing trivalent vanadium ions on the negative electrode and a solution containing pentavalent vanadium ions, which are then reduced by a reducing agent to form a solution containing tetravalent vanadium ions, on the positive electrode.

6. The method according to claim 5, wherein said inorganic acid is concentrated sulfuric acid.

7. The method according to claim 6, wherein the reducing agent is selected from the group consisting of sulfurous acid, hydrazine dihydrochloride, hydrogen peroxide and hydrogen.

8. The method according to any one of claims 1-7, wherein said vanadium compound is vanadium pentaoxide.

9. The method according to any one of claims 1-7, wherein said vanadium compound is ammonium metavanadate.

10. The method according to any one of claims 1-7, wherein said increased concentration of vanadium tetravalent is at least 1M.

* * * * *

UNITED STATES PATENT AND TRADEMARK OFFICE
CERTIFICATE OF CORRECTION

PATENT NO. : 5,250,158
DATED      : October 5, 1993
INVENTOR(S) : Hiroko Kaneko et al.

It is certified that error appears in the above-indentified patent and that said Letters Patent is hereby corrected as shown below:

On the title page, Item [75],

The fourth inventor's name, should read:  --Kanji Sato--

Signed and Sealed this

Twenty-ninth Day of March, 1994

Attest:

BRUCE LEHMAN

*Attesting Officer*        *Commissioner of Patents and Trademarks*